United States Patent [19]
Eriksson et al.

[11] Patent Number: 6,064,873
[45] Date of Patent: May 16, 2000

[54] METHOD AND APPARATUS FOR CONTROLLING ECHO ON BOTH SIDES OF A CONNECTION

[75] Inventors: Gunnar Eriksson, Huddinge; Tõnu Trump, Stockholm; Tommy Svensson, Älta, all of Sweden

[73] Assignee: Telefonaktiebolaget L M Ericsson (publ), Stockholm, Sweden

[21] Appl. No.: 08/825,017

[22] Filed: Mar. 26, 1997

[51] Int. Cl.⁷ .................................................. H04B 7/015
[52] U.S. Cl. .................. 455/403; 455/424; 455/570; 379/410; 370/290
[58] Field of Search ................................ 455/569, 570, 455/554, 550, 403, 422, 423, 424, 561; 379/406, 410, 411, 407; 370/290, 286, 287

[56] References Cited

U.S. PATENT DOCUMENTS

| | | | |
|---|---|---|---|
| 4,629,829 | 12/1986 | Puhl et al. | 379/58 |
| 4,935,919 | 6/1990 | Hiraguchi | 379/410 |
| 5,283,784 | 2/1994 | Genter . | |
| 5,295,136 | 3/1994 | Ashley et al. | 379/411 |
| 5,323,459 | 6/1994 | Hirano | 379/391 |
| 5,477,535 | 12/1995 | Lahdemaki | 379/409 |
| 5,559,881 | 9/1996 | Sih | 379/410 |
| 5,587,998 | 12/1996 | Velardo et al. . | |
| 5,610,909 | 3/1997 | Shaw | 370/291 |

FOREIGN PATENT DOCUMENTS

| | | |
|---|---|---|
| 0 439 139 A2 | 1/1991 | European Pat. Off. . |
| 42 16 911 | 11/1992 | Germany . |
| 3159423 | 7/1991 | Japan . |
| 7288493 | 10/1995 | Japan . |
| 2256351 | 12/1992 | United Kingdom . |

OTHER PUBLICATIONS

PCT Search Report dated Oct. 21, 1998.

A Double Talk Detector Based on Coherence by Tomas Gänsler, Maria Hansson and Göran Salomonsson Signal Processing Group, Dept. of Elec. Eng. and Comp. Science Lund University, Box 118, S–221 00 Lund, Sweden pp. 332–336.

Echo Canceler with Two Echo Path Models by Kazuo Ochiai, Takashi Araseki and Takashi Ogihara IEEE Transactions on Communications, vol. Com–25, No. 6, Jun. 1977 pp. 589–595.

A. Eriksson et al. "Ericsson Echo Cancellers A Key to Improved Speech Quality" Ericsson Review, vol. 73, No. 1, Jan. 1, 1996, pp. 25–33, XP000000584598.

The European Patent *Office Standard Search Report*, File No. RS 99236 US, Nov. 14, 1997.

*Primary Examiner*—Reinhard J. Eisenzopf
*Assistant Examiner*—Lester G. Kincaid
*Attorney, Agent, or Firm*—Jenkens & Gilchrist, P.C.

[57] ABSTRACT

A single two-ended echo canceller is provided that uses an adaptive FIR filter to model the impulse response of the echo path and cancel the echo originating from the PSTN side of the connection, and a non-linear processor controlled by input signal levels to cancel the echo originating from the mobile phone side of the connection. Since the linear processing function is not used for cancelling echoes of the mobile phone side, the algorithms directed to estimating and cancelling echoes on the two sides of the connection can be executed in a single DSP, with all of the attendant advantages.

20 Claims, 2 Drawing Sheets

METHOD AND APPARATUS FOR CONTROLLING ECHO ON BOTH SIDES OF A CONNECTION

BACKGROUND OF THE INVENTION

1. Technical Field of the Invention

The present invention relates in general to the telecommunications field and, in particular, to echo cancellation in telephony systems.

2. Description of Related Art

"Echo" is a phenomenon that can occur in a telephony system whenever a portion of transmitted speech signal energy is reflected back to a sender. These reflections are caused by impedance mismatches in analog portions of the telephony network. There can be many different sources of echo, such as, for example, a hybrid circuit that converts a 4-wire line to a 2-wire line in a Public Switched Telephone Network (PSTN) subscriber interface, or acoustical cross-talk in a mobile radiotelephone. The presence of echo along with a substantial delay (e.g., physical distance or processing delay) can severely degrade the quality of the speech signals being processed.

An echo canceller is a device that is commonly used in telephony systems to suppress or remove echoes in long distance traffic. For example, in cellular Public Land Mobile Networks (PLMNs), echo cancellers are used in mobile services switching centers (MSCs) to suppress or remove echoes in speech traffic. Echo cancellers are also used in mobile radiotelephones and "handsfree" telephone equipment to compensate for acoustical echoes. A general description of an existing echo cancellation technique can be found in the paper entitled: "A Double Talk Detector Based on Coherence" by Gänsler et al, Signal Processing Group, Dept. of Elec. Eng. and Comp. Science, Lund University, Sweden.

In principle, a digital mobile radiotelephone handset should not generate echoes, because the connection used comprises 4-wires down to the handset. In practice, however, many such mobile phones generate echoes that originate from acoustical or mechanical cross-talk in the handset. This type of echo is annoying to users, especially if the system operator has elected to raise the downlink signal levels. Raising the downlink signal levels has become an accepted practice, since many customers have complained about the low output levels from the mobile handsets, ' speakers.

Existing telephony systems that provide long distance traffic and MSCs in Public Land Mobile Networks (PLMNs) employ echo cancellers to control echoes generated in the PSTN side of the connection. For example, FIG. 1 is a simplified schematic block diagram of a conventional echo canceller (10) used in long distance traffic systems and MSCs. The main component of such an echo canceller is an adaptive finite-impulse-response (FIR) filter 12. Under the control of an adaptation algorithm (e.g., executing in software), filter 12 models the impulse response of the echo path. A non-linear processor (NLP) 14 is used to remove residual echo that may remain after linear processing of the input signal. A double talk detector (DTD) 16 is used to control and inhibit the adaptation process, when the echo signal to "near end" signal ratio is of such a value that no additional improvement in the echo path estimation can be obtained by further adaptation of filter 12. The block denoted by 18 represents the echo source in the telephony system which generates the "desired" signal, y(t), as a function of the "far end" signal, x(t), and the "near end" signal, v(t). A comfort noise generator (CNG) 20 is used to generate a noise signal which is essentially similar to the background noise at the "near end". This noise signal is inserted into the connection while the NLP 14 is active. It is generally accepted that an echo canceller should be switched off on those connections that carry high bit-rate data traffic with "V-series" modems, since these modems include their own echo cancellers. For this purpose, network echo cancellers typically include a tone disabler (TD) 22, which detects the modem's answering tone (e.g., 2100 Hz tone) and disables some or all of the echo canceller's functions if answering tones with certain predetermined characteristics are received.

There are a number of differences between the characteristics of the echo signals that originate in PSTNs and those that originate in digital mobile phones. For example, the echo path from a PSTN is quasi-linear and, therefore, can be readily modeled by a linear filter. A number of existing solutions, which are based on adaptive filtering techniques, can be used successfully to cancel these types of echoes. The length of the echo path "seen" from an echo canceller in such a network can be up to 64 ms, which implies the use of an adaptive filter of up to 512 taps to model the echo path. The computational resources required to execute the adaptive algorithm for that long a filter consume a large portion of the capacity of the digital signal processor (DSP) which makes up the echo canceller. Furthermore, the echo return loss (ERL) from a PSTN depends on the balance circuitry used in the network. As a general rule, the ERL (measured in dB) can be considered as a random variable selected from a Gaussian distribution, with a mean of 13.6 dB and a standard deviation of 2.8 dB for a segregated loop balancing scheme.

On the other hand, the echo path for a digital mobile phone is non-linear and time-varying, due to the use of two speech coder/decoder (codec) pairs and radio interfaces in the transmission path. Additionally, the level of the echo in a digital mobile phone is much lower than that from a PSTN. For example, the specification for the digital cellular Global System for Mobile Communications (GSM) requires an ERL of 46 dB (for the mobile phones) measured for pure tones of level 0 dBm in the 300–3400 Hz band. However, the ERL can be lower if signals other than pure tones are used for the measurements, but suppression levels of about 40 dB can still be expected. In other words, the quantization noise appears to be a considerable source for the echo path non-linearity. In fact, the ERL from a digital mobile phone is comparable to the ERL that can be obtained by the linear filter portion of a conventional PSTN echo canceller. For the above-described reasons, it is unlikely that the echo from a digital mobile phone would be cancelled by more than a few dB by a linear filter.

As such, the existing echo cancellers are designed to cancel echo that originates from only one side of the switching connection. Consequently, it follows that when echoes originating on both sides of the switching connection are to be cancelled, then two echo cancellers per connection are used.

In an exemplary configuration, a plurality of echo cancellers are integrated into a digital switching system. For example, a plurality of echo cancellers manufactured by Ericsson Radio Systems AB have been integrated into an Ericsson AXE 10 digital switching system. These echo cancellers form a part of the AXE 10 Trunk and Signalling Subsystem (TSS) and are directly connected to the group switch in a pool configuration (referred to as "ECP" or echo cancellers in a pool). The technique used to operate these echo cancellers in a network has been to connect a device to each trunk. In other words, when echo cancellation is needed, the AXE 10 selects one of the echo cancellers from the pool and routes the connection through the selected echo canceller. In this way, the AXE 10 ECP configuration can concentrate the traffic and thus reduce the total number of echo cancellers used, in comparison with the earlier direct connection trunk configurations used.

A problem arises if echoes from the two sides of the switching connection are controlled by separate echo cancellers. FIG. 2 is a diagram of an exemplary system (50) in which two echo cancellers 52 and 54 (e.g., two echo cancellers 10 shown in FIG. 1) are being used to control echoes originating on both sides of the connection in an MSC 56. Obviously, as illustrated by FIG. 2, double the usual number of echo cancellers are needed to control echoes from both sides of the connection, if separate devices are used. Furthermore, if the echo cancellers used are connected in a pool configuration (e.g., an ECP 101 or ECP 303 manufactured by Ericsson Radio Systems AB), the increase in the number of echo cancellers involved results in a proportional increase in the number of group switch multiple input/output positions required. Additionally, some other functions, such as the 2100 Hz tone detectors have to be included in both of the echo cancellers used.

SUMMARY OF THE INVENTION

It is, therefore, an object of the present invention to cancel echoes that originate from two sides of a switching connection.

It is also an object of the present invention to cancel echoes that originate from two sides of a switching connection with a single echo cancellation device.

It is yet another object of the present invention to reduce the number of group switch multiple positions needed for echo cancellers.

It is still another object of the present invention to reduce the physical space and power requirements for echo cancellers.

It is yet another object of the present invention to cancel echoes that originate from both a PSTN and a digital mobile phone.

In accordance with the present invention, the foregoing and other objects are achieved by a single two-ended echo canceller that uses an adaptive FIR filter to model the impulse response of the echo path and cancel the echo originating from the PSTN side of the connection, and a non-linear processor controlled by input signal levels to cancel the echo originating from the mobile phone side of the connection. Since the linear processing function is not used for cancelling echoes of the mobile phone side, the algorithms directed to estimating and cancelling echoes on the two sides of the connection can be executed in a single DSP.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Figure 1:
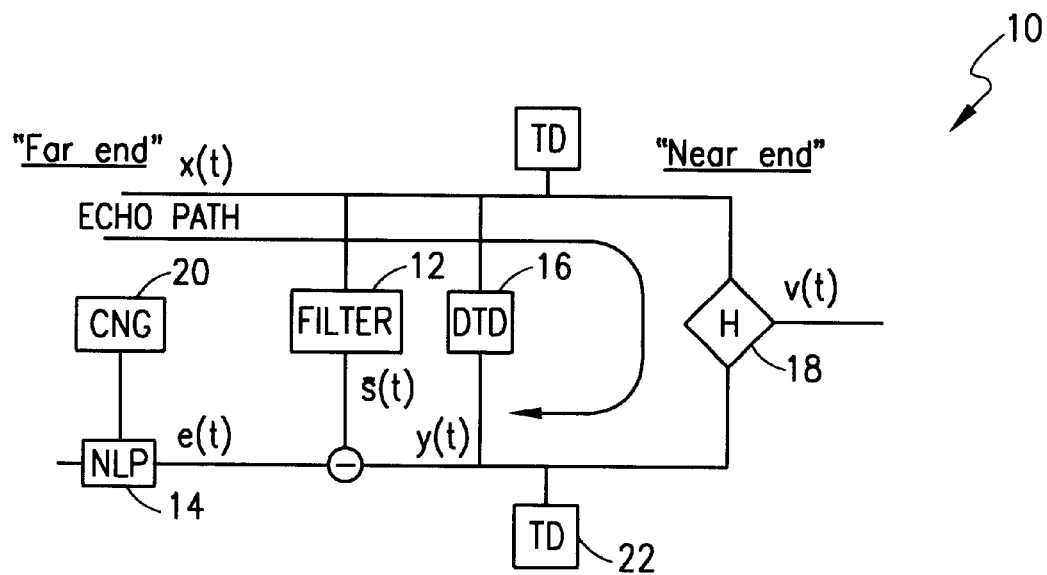
FIG. 1 is a simplified schematic block diagram of a conventional echo canceller used in long distance traffic systems and MSCs.
Figure 2:
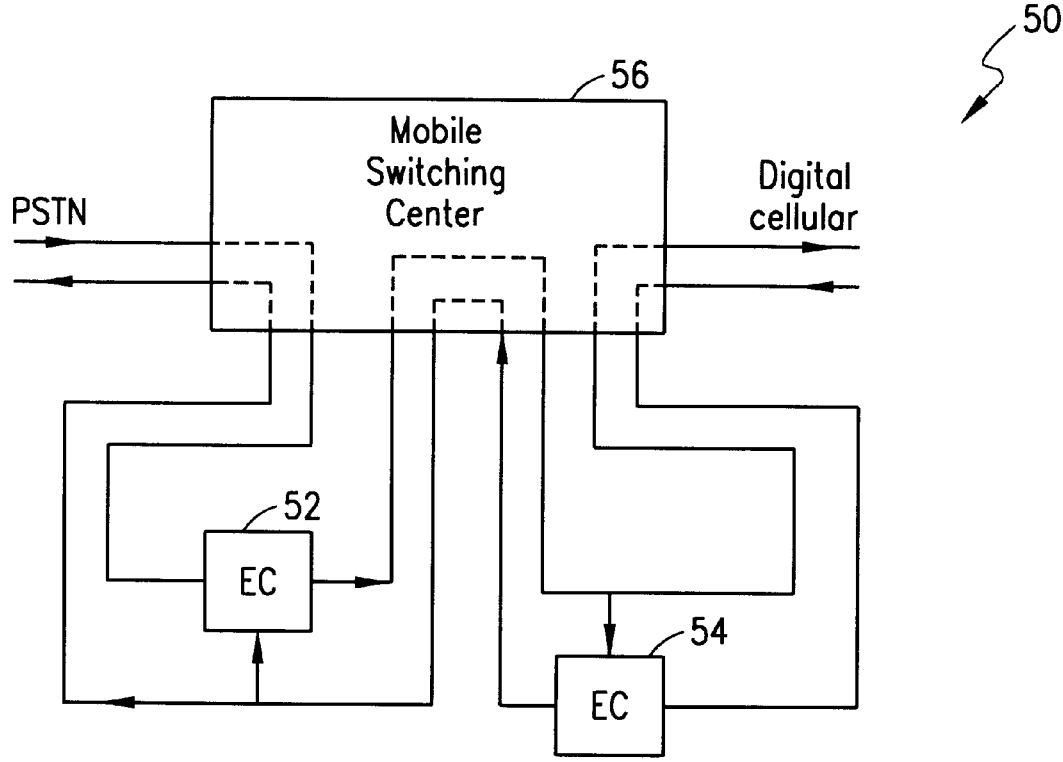
FIG. 2 is a diagram of an exemplary system in which two echo cancellers are being used to control echoes originating on both sides of a connection in an MSC.
Figure 3:
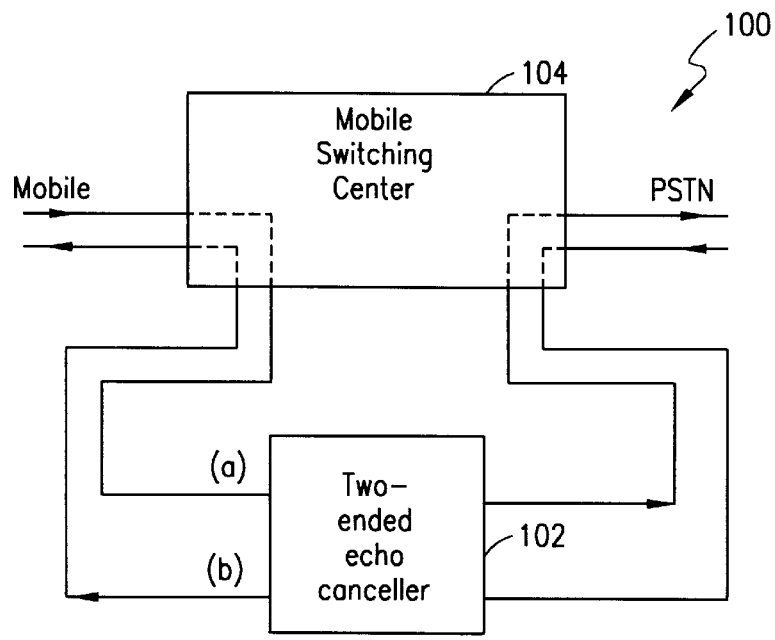
FIG. 3 is a block diagram of an exemplary system that illustrates the use of a single two-ended echo canceller to control echoes originating from both sides of a switch connection, in accordance with a preferred embodiment of the present invention.

FIG. 3 is a block diagram of an exemplary system (100) that illustrates the use of a single two-ended echo canceller (102) to control echoes originating from both sides of a switch connection, in accordance with a preferred embodiment of the present invention. Although echo canceller 102 is shown in a PLMN environment, it is for illustrative purposes only, and the invention is not intended to be so limited. For example, echo canceller 102 can also be shown connected to a switch in a long distance traffic system. As such, a significant number of group switch input/output positions can be saved (e.g., in MSC 104), and a number of functions (e.g., tone detection and comfort noise generation) for each side of the connection can be shared in the one echo canceller (102). Additionally, the two-ended echo canceller (102) occupies less physical space in the MSC (104) than would be occupied by two conventional echo cancellers. The latter is true even if the two-ended echo canceller is connected directly to a trunk line, which also lies within the scope of the present invention.

Figure 4:
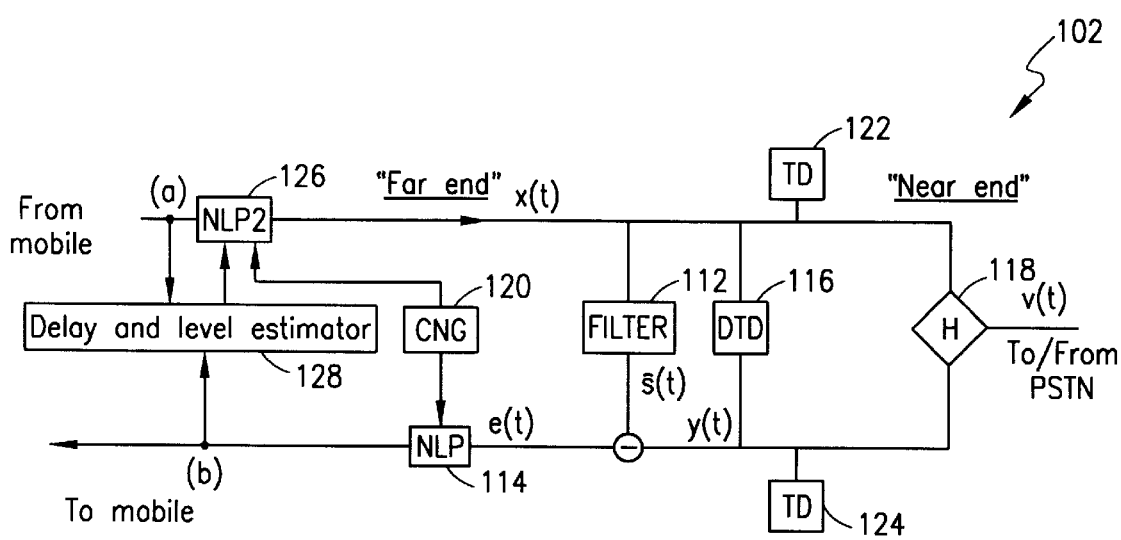
FIG. 4 is a block diagram that shows the details of the exemplary two-ended echo canceller shown in FIG. 3.

FIG. 4 is a block diagram that shows the details of the exemplary two-ended echo canceller 102 shown in FIG. 3. Essentially, one portion of echo canceller 102 cancels echoes originating from the PSTN side, and the second portion of echo canceller 102 cancels echoes originating from the mobile phone side. Preferably, the mobile phone in use on the one side is a digital mobile phone, but the invention is not intended to be so limited and could also comprise an analog or hybrid analog/digital phone. Echo canceller 102 includes a FIR filter 112. Under the control of an adaptation algorithm (e.g., executing in software), filter 112 models the impulse response of the echo path for the PSTN side. On the PSTN side, NLP 114 is used to remove any residual echo that may remain after linear processing of the input signal. A DTD 116 is used to control and inhibit the adaptation process, when the echo signal to "near end" signal ratio is of such a value that no additional improvement in the echo path estimation can be obtained by further adaptation of filter 112. Block 118 represents the echo source in the telephony system which generates the "desired" signal, y(t), as a function of the "far end" signal, x(t), and the "near end" signal, v(t). A CNG 120 is used to generate a noise signal which is essentially similar to the background noise at the "near end". This noise signal is inserted into the connection while NLP 114 is active. A first and second TD 122 and 124 detect modem answering tones (e.g., 2100 Hz) and disable some or all of the echo canceller's functions if tones with certain predetermined characteristics are received.

The second portion of echo canceller 102, which cancels echoes originating from the mobile side of the switching connection, also includes a second NLP 126 and a delay and level estimator 128. Generally, in operation, this portion of echo canceller 102 first determines if the current mobile phone in use (not explicitly shown) is generating echo signals. Since some mobile phones on the market cause little or no echo problems, while others can generate clearly audible echo signals, the second NLP 126 clips only the audible echo signals and not the signals from the "good" mobile phones. The echo canceller (102) then estimates the echo path delay for the mobile phone side of the connection. Measurements have shown that the dispersive part of the mobile phone's echo path is relatively short (distinguishing it from the typical PSTN echo), and the relevant parameter to estimate is the echo path delay (referred to hereinafter as the "delay estimation"). Next, the echo canceller (102) estimates the relationship between the power of the signal transmitted towards the mobile (at b) and the power of the echo (at a), which will be referred to hereinafter as the "level estimation".

As described earlier, the portion of echo canceller 102 that cancels echo from the mobile phone side of the connection further comprises an estimator (128) for estimating the echo path delay and the power level of the echo (delay and level estimation), and a second NLP (126). NLP 126 is activated (i.e., replacing the signal coming from the mobile side with comfort noise) if enough signal power has been transmitted toward the mobile phone to generate an audible echo. NLP 126 is activated for a predetermined amount of time after a threshold amount of signal power has been detected (at b). The delay and level estimator 128 determines the predetermined amount of activation time, and the level of signal power that constitutes the threshold amount of power. These estimates can be obtained, for example, by computing the correlation functions of non-linearly transformed signals at points (a) and (b), and then searching for the maximum values. Preferably, NLP 126 is activated if the mobile phone being used generates an appreciable amount of audible echo (e.g., surpasses a predetermined threshold level). As an added advantage, the DTD 116 can disable the operation of the second NLP 126 (and/or first NLP 114) if the parties using the mobile phone and PSTN telephone are talking simultaneously.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An echo canceller for use in cancelling echoes from two sides of a connection, comprising:
    a first part comprising an FIR filter-based echo canceller for use in cancelling a network echo received from one side of the connection; and
    a second part coupled to said first part, said second part comprising a non-linear processor and a delay and level estimator connected to said non-linear processor for use in cancelling a second echo received from a digital mobile side of the connection.
2. The echo canceller of claim 1, wherein said connection comprises a switching connection in a mobile services switching center.
3. The echo canceller of claim 1, wherein said connection comprises a switching connection in a long distance traffic system.
4. The echo canceller of claim 1, further comprising a comfort noise generator connected to said non-linear processor.
5. The echo canceller of claim 1, wherein said one side of the connection comprises a PSTN.
6. The echo canceller of claim 1, wherein said digital mobile side of the connection comprises a digital mobile phone.
7. The echo canceller of claim 1, wherein said connection comprises a direct connection to a trunk line.
8. The echo canceller of claim 1 wherein the delay and level estimator estimates an echo path delay on the digital mobile side of the connection and estimates a relationship between a signal power of a signal transmitted towards the digital mobile side of the connection and a signal power of the second echo.
9. The echo canceller of claim 1 wherein the non-linear processor is activated for a selected amount of time after a threshold amount of signal power of a signal transmitted towards the digital mobile side of the connection is detected.
10. An apparatus for use in cancelling an echo originating from a digital mobile phone, comprising:
    a non-linear processor;
    a comfort noise generator coupled to said non-linear processor, for generating a comfort noise signal in response to an estimated background noise level; and
    an echo delay and power level estimator coupled to said non-linear processor for at least estimating a relationship between a power level of a signal transmitted toward the digital mobile phone and the power of the echo originating from the digital mobile phone.
11. The apparatus of claim 10, further comprising a digital signal processor.
12. The apparatus of claim 10, further comprising an echo canceller for use in cancelling echoes originating from a PSTN.
13. A method for use in cancelling echoes from two sides of a switch connection, comprising the steps of:
    transmitting a first signal from a first side of the switch connection;
    estimating an impulse response for a first echo signal originating on said first side of the switch connection, wherein said first echo signal comprises a reflection of said first signal;
    cancelling said first echo signal;
    transmitting a second signal from a second side of the switch connection;
    detecting a second echo signal originating on the second side of the switch connection, wherein said second echo signal comprises a reflection of said second signal;
    estimating a delay for said second echo signal;
    estimating a relationship between a first power signal directed toward said second side of said switch connection and said second echo signal; and
    cancelling said second echo signal responsive to said delay and said relationship.
14. The method of claim 13, wherein said first echo signal comprises an echo signal originating from a PSTN.
15. The method of claim 13, wherein said second echo signal comprises an echo signal originating from a digital mobile phone.
16. The method of claim 13, wherein the step of cancelling a second echo signal comprises the step of injecting a comfort noise signal.
17. The method of claim 13, wherein said switch connection comprises a switch connection in a mobile services switching center.
18. The method of claim 13, wherein said switch connection comprises a switch connection in a long distance traffic system.
19. The method of claim 13, wherein the step of cancelling the second echo signal is responsive to a detection of a threshold amount of signal power for said second signal.
20. The method of claim 13, further comprising the step of calculating an amount of time for performing the step of cancelling the second echo signal responsive to said relationship.

* * * * *